United States Patent [19]
Horrocks et al.

[11] Patent Number: 5,645,926
[45] Date of Patent: Jul. 8, 1997

[54] FIRE AND HEAT RESISTANT MATERIALS

[75] Inventors: Arthur Richard Horrocks, Bolton; Subhash Chander Anand, Harwood; Barry Jakeman Hill, Epsom, all of England

[73] Assignee: British Technology Group Limited, London, England

[21] Appl. No.: 307,646

[22] PCT Filed: Mar. 19, 1993

[86] PCT No.: PCT/GB93/00567

§ 371 Date: Feb. 3, 1995

§ 102(e) Date: Feb. 3, 1995

[87] PCT Pub. No.: WO93/18824

PCT Pub. Date: Sep. 30, 1993

[30] Foreign Application Priority Data

Mar. 20, 1992 [GB] United Kingdom ............... 9206060
Nov. 10, 1992 [GB] United Kingdom ............... 9223545

[51] Int. Cl.$^6$ .................. A62C 8/06; B32B 5/26; D06M 23/08; D04M 1/42
[52] U.S. Cl. .................. 442/234; 428/920; 428/921; 442/257; 442/268; 442/243; 442/316; 442/318; 442/377; 442/385
[58] Field of Search .................. 428/283, 284, 428/286, 289, 920, 921

[56] References Cited

U.S. PATENT DOCUMENTS

| | | | |
|---|---|---|---|
| 3,915,777 | 10/1975 | Kaplan | 428/921 X |
| 3,934,066 | 1/1976 | Murch | |
| 4,726,987 | 2/1988 | Trask et al. | |
| 4,847,140 | 7/1989 | Jaskowski | |
| 5,384,188 | 1/1995 | Lebold et al. | 428/920 X |

FOREIGN PATENT DOCUMENTS

| | | |
|---|---|---|
| 0257568 | 3/1988 | European Pat. Off. |
| 272793 | 6/1988 | European Pat. Off. |
| 0492248 | 7/1992 | European Pat. Off. |
| 4007060 | 9/1991 | Germany |
| 1310355 | 3/1973 | United Kingdom |
| 1488649 | 10/1977 | United Kingdom |
| 1519772 | 8/1978 | United Kingdom |
| 1523152 | 8/1978 | United Kingdom |
| 2011502 | 7/1979 | United Kingdom |
| 2041293 | 9/1980 | United Kingdom |
| 9012134 | 10/1990 | WIPO |

OTHER PUBLICATIONS

Horrocks, et al: "Fibre–Intumescent Interactive Systems for Barrier Textiles" Flame Retardants, 26/27 Jan. 1994.

*Primary Examiner*—Daniel Zirker
*Attorney, Agent, or Firm*—Cushman, Darby & Cushman IP Group of Pillsbury Madison & Sutro LLP

[57] ABSTRACT

A flexible fire and heat resistant material comprising an intimate mixture of organic intumescent filler and organic fibres adapted to char intensely within the temperature range of 200° C. to 500° C. The added presence of inorganic fibre components enhances the structural integrity of this structure both during char formation up to 500° C. and at higher temperatures up to 1200° C. once char oxidation takes place.

29 Claims, 6 Drawing Sheets

FIRE AND HEAT RESISTANT MATERIALS

The present Invention relates to fire and heat resistant materials and their use as barriers to the propagation of fire heat, and flame.

A wide variety of materials are employed as barriers to the propagation of fire. They resist the advance of a fire to a corresponding wide degree. Clearly materials which readily ignite and are readily combusted provide little or no barrier whilst at the other extreme materials such as asbestos will resist extremes of heat and fire.

Where a rigid barrier such as an asbestos sheet cannot be utilised, protective and barrier fabric structures are adopted in a variety of types of textile products having different levels of performance. Within the United Kingdom, for example, such products find themselves within the end-use areas of both protective clothing (workwear, civil emergency services, defence organisations) and bartlet textiles (transport upholstery fabrics, transport upholstery barriers, contract/domestic barriers). In terms of performance, known textiles designed for heat and flame protection can be divided into three broad categories: (i) flame retardant conventional textiles which transform to char barriers when heated above 250° C.; (ii) higher performance textiles which char above 400° C.; and (iii) ceramic fibre-containing fabrics which resist prolonged exposures up to about 1000° C.

Fabrics possessing organic fibre contents which have desirable textile properties at ambient conditions, carbonise when heated in air or inert atmosphere above 250° C. and slowly oxidise in air above 400°–500° C. are well known. These are typified by a whole range of products ranging from flame retardant cotton and wool fabrics to inherently flame and heat resistant polyaromatic structures. Of these, the higher performance examples such as aramid and/or carbonised fibre-containing barrier fabrics will survive only a few minutes when heated up to temperatures as high as 1000° C.

The organic materials which are used to form these known initially flexible barriers tend to char upon exposure to high temperature to produce a black residue. Although these charred residues are potentially valuable as barriers to the propagation of the fire, in practice, as indicated above, they are not terribly effective because the charred residues are brittle and become increasingly fragile when they oxidise at temperatures above 400° C. Both these results mean that the residues will tend to lose their mechanical integrity in the harsh environments associated with many fires e.g. in vehicles of various kinds where they may be subject to strenuous vibration and form ashes which provide no barrier at all to flame propagation.

Inorganic materials such as ceramic fibres have also been used to form flexible barriers but although they do not char, they too can become brittle and they may even melt when exposed to high temperatures leaving residues which are no longer effective to prevent the spread of fire. One class of products not subject to these disadvantages are the fabrics comprising only inorganic fibres based on silica or alumina which have been found to withstand temperatures in excess of 900° C. and as high as 1100° C. for considerable periods of time (e.g. of the order of days and weeks). However, these particular inorganic materials are even more expensive than the high performance organic fibre-containing barrier fabrics they replace. Also they have significantly higher densities and very high moduli which means they may be unacceptable when lightness and flexibility respectively are at a premium.

Another quite different approach which is widely used to render materials resistant to fire is the application of an intumescent paint or coating. Such paint formulations char and give off gas when exposed to high temperatures and thus form an expanded charred layer which serves to insulate the substrate and to protect it from the fire. Such paints and coatings cannot be used on all substrates however or in all circumstances. They cannot be used, for example, where flexibility and permeability of the underlying substrate are essential properties. In addition, they suffer the disadvantage that once they have been transformed to an intumescent char, this structure is brittle and easily disintegrates when subjected to flexural or torsional motions.

An object of the present Invention Is to provide a fire-resistant material which is at all times flexible, which resists fire and heat and which expands and chars upon exposure to heat to produce a barrier which retains its structural indegrity. We have discovered that such materials can in some cases be produced by incorporating particular intumescent components into suitable designs of fibrous core.

Accordingly, from a first aspect, the present invention provides a flexible fire and heat resistant material comprising an intimate mixture of organic intumescent filler and organic fibres adapted to char intensely within the temperature range 200° C. to 500° C. By "intensely" in this context is meant that carbonising reactions dominate the thermal degradation mechanisms occurring in the organic fibre components.

Even when the organic fibres are inherently fire resistant, to produce a sufficiently intense fibre char it will normally be necessary to coat or treat the organic fibres with a suitable fire retardant substance or to use fibres which release such a substance on being heated.

Research on the materials of the present invention to establish exactly why they are able to maintain their barrier qualities and mechanical integrity even in adverse conditions, has revealed that the coincidental fibre/intumescent char formation is accompanied by the wetting of fibre surfaces by liquid acidic species generated from the flame retardant, and/or any other acid-generating species in the organic fibres, and acidic products from the decomposing intumescent. This in turn results in the charred surfaces of the fibres and the adjacent intumescent bonding together in a reactive or alloying manner to produce a fibre-reinforced amorphous intumescent char structure having all the advantages of an intumescent as far as fire-resistance is concerned but without the associated disadvantages of inflexibility and brittleness up to now associated with these substances.

This possibility of such a bonding effect, which is hereinafter referred to as 'char bonding', was totally unexpected prior to the advent of the present invention and its importance in establishing a whole new range of fire-resistant materials able to be used in the most demanding environments, should not be underestimated.

In practice, with the materials of the present invention, full char formation will have occurred by 400°–500° C. and the intumescent will have undergone at least some degree of expansion. Above 500° C. (in air), oxidation of the char will begin at the outer surfaces of the material and will spread inwards at a rate determined by oxygen diffusion into the structure. As the temperature increases, the intumescent, which continues to expand, will play an increasingly important part in maintaining the mechanical integrity of the structure by blocking the intrusion of the oxygen into the core region of the material.

To work as intended, it is necessary that the intumescent material move the fibres in addition to flowing around them.

If the fibres are packed too tightly, the intumescent fills the inter-fibre voids without moving the fibres, whereas if the fibres are packed too loosely, the intumescent may well shake out of the product prior to use. It has been discovered that a nonwoven fabric structure has Just the right properties to avoid both these possibilities. However, woven, knitted or other fabric structures designed to have similar geometric assembled fibre characteristics to the nonwoven structure can be used instead if desired. All these various constructions also have the advantage that they permit the material to be flexible at both low and high temperatures, to expand when exposed to elevated temperatures, and to accommodate and move with the intumescent when this is activated. Appearance and feel is of a light-weight composite fabric. The material can be used in all applications where flame retardancy, slow heat release and heat barrier characteristics are required. Upholstery in aircraft, trains, buses and ships, bulkheads, architectural framework protection and protective clothing are some of the indicated uses.

The materials of the present invention may be constructed so as to provide a greater or smaller degree of expansion, as desired. For example, in applications, a relatively large expansion may be desirable so as to provide a thicker heat resistant barrier to the propagation of a fire at lower temperatures. In other cases this may not be necessary and the degree of expansion need only be that which will compensate for the reduction in the thickness of the char caused by its ablation at higher temperatures.

According to another aspect, the invention resides in methods of forming the materials of the present invention. Specific examples of such methods appear in the following description.

During manufacture of the materials of the present invention, the intumescent should be applied to the fibre assembly in a manner which allows it to penetrate into the core of the assembly (as opposed to forming an exterior coating). Thus in one example, the intumescent is simply sprinkled in powder form on to a nonwoven, woven or knitted fabric core of the composite structure. Alternatively, it may be introduced between different layers of the fibres during assembly of the core. Other ways of dispersing the intumescent in the fibrous layer may also be applicable e.g. spraying in the intumescent during the formation of a fibrous felt.

Optionally, the intumescent powder is initially bonded to the fibres by an adhesive. Alternatively, an initial fibre-intumescent adhesion may be achieved by introducing a fusible adhesive copolymer into the intumescent.

The amount of intumescent employed in the material is not critical provided that it is sufficient to achieve the desired results. However, the greater the amount of intumescent present, the more likely it is to be beneficial in improving the barrier properties of the char. This may be advantageous in some applications.

Conveniently, the amount of intumescent present in the material is sufficient to cause it to increase in thickness by at least 50% when exposed to a temperature of at least 500° C.

A wide variety of organic fibres may be utilised including cotton, viscose and wool all of which will normally have been rendered fire resistant by appropriate flame retardant treatment to give the necessary degree of charring within the desired temperature range.

A wide variety of such treatments are commercially available. For example, the flame retardant process can be carried out by chemical treatment of the fibres before, during or after processing into a textile product or the fibres can be flame retarded by modification of their chemical structure during manufacture or by incorporation of flame retardant additives during manufacture.

In one embodiment of the invention, for example, the organic fibres may be cotton to which a flame retardant treatment such as PROBAN (Albright and Wilson) has been applied at a level commensurate with a phosphorous concentration of 2.5% by weight or greater with respect to the fibre weight. As an alternative, the organic fibres might be viscose to which a flame retardant additive has been added during the fibre production stage.

In preferred embodiments, the fire-resistant material of the present invention also includes an inorganic fibre component.

Conveniently, the inorganic fibre component has its melting point or melting points at significantly higher temperatures than 500° C. so as to result in a correspondingly high chemical oxidative resistance at these higher temperatures.

By reinforcing the effect of the intumescent in impeding oxygen diffusion into the material, the inorganic fibre component delays complete oxidation of the residual carbon in the material for 2 to 10 minutes, say, even at temperatures of 900°–1200° C. In addition, the inorganic component will create a skeletal structure which provides the material with a thermally insulative property even after all the carbonaceous materials in it have been gasified.

Conveniently, in these cases, the amount of intumescent present in the material is sufficient to maintain the initial thickness of the material for periods of 10 minutes or more when heated up to 900° C. Thus in preferred embodiments of the invention, the intumescent/fibre ratio (by weight) lies in the range 10–100% with an additional appropriate concentration of intumescent adhesive material usually at a level proportionate to that of the intumescent.

Conveniently, the inorganic fibre component is provided either by having the material include an intimate blend of organic and inorganic fibres and/or by using fibres which are part organic and part inorganic as a result of their molecular structure. Hereinafter, fibres which are part organic and part inorganic in this way will be termed 'hybrid' organic fibres while organic fibres having either no inorganic component or only a negligible inorganic component, will be termed 'simple' organic fibres.

The currently preferred hybrid fibre type is a viscose staple fibre containing silicic acid and sold under the Trade Mark VISIL by the Kemira Group Oy of Valkeakoski, Finland. As compared with a blend of simple organic and inorganic fibres, the presence of the two components in the one fibre has the important advantage that during charring of the organic component, the generation of an inorganic core to each fibre occurs. This offers a unique inorganic reinforcement to the char-bonded structure.

The fact that VISIL fibres per se maintain their integrity at up to 900° C. and yet their incorporation in a structure according to the present invention enables them to do so at temperatures up to 1000° C. or even 1200° C., can only be explained by the synergistic effect between the organic fibres and the intumescent hereinbefore referred to as char bonding.

For the avoidance of doubt, it is pointed out here that although aromatic organic fibres such as polyaramids, novoloids (e.g. Kynol) and polybenzimidazoles produce an intense char, they are inherently unsuitable for use as the organic fibre component in the materials of the present invention because they only begin to char intensely at too high a temperature (400°–500° C.). This prevents satisfactory char bonding from taking place although some degree of physical interaction between their carbonising surfaces and the intumescent char does occur which offers some degree of consolidating effect to the degrading structure. Thus, in accordance with another aspect of the invention, the inorganic component is accompanied or replaced by a suitably incompatible organic fibre i.e. an organic fibre which will not char intensely over the required temperature range to produce char bonding.

It will be seen that the materials of the present invention are constructed in such a way as to provide an initial response to flame to flame or heat which results in an expansion in volume with the material retaining a significant portion of this increased volume for a period even when exposed to higher temperatures. In the preferred embodiments, the materials incorporate an organic first fibrous component which chars upon exposure to heat and flame, an inorganic second fibrous component which is relatively unaffected by the conditions which produce the charring of the first fibrous component, and an intumescent which swells and causes an initial expansion of the barrier. Typically, after some ten minutes exposure at temperatures of around 900° C., say, oxidation of the organic fibre and intumescent components will have reduced the increased thickness of the barrier back to something like its original value.

To summarise, the materials of the preferred embodiments provide normal textile properties under ambient conditions and yet exhibit high degrees of flame and heat protection at temperatures above 300° C. As the temperature rises to 500° C., so the thickness and thermally insulative properties increase and even when heated at 1000° C. for up to 10 minutes, fabrics retain their original thickness. In areas of high vibration, the retention of flexibility up to 1200° C., enables these novel structures to be used satisfactorily even in harsh working environments. Their employment as flame/heat barriers in supported environments and application as outer surface protection zones of engine or fuel heat flame barrier structures in transport systems are examples.

Even in those embodiments of the invention where the materials contain no inorganic fibre component or incompatible organic fibres, the structured char still forms a uniquely flexible and fairly oxygen impermeable structure which can provide barrier properties at temperatures above 500° C. for limited periods. The presence of an intumescent is essential however, as without it, the simple fibrous chars would have high oxygen permeabilities and could survive at temperatures above 700° C. for less than 2 minutes. With the materials of the present invention, however, the presence of the intumescent at the right levels, creates chars which disintegrate less easily and which start to oxidise within the 400°–500° C. range and have significantly reduced oxidation rates above 500° C.

The materials of the present invention may be used directly as a barrier material or they may be mounted upon a backing layer or between or about a backing layer and a facing layer. The backing layer and the facing layer will normally be formed from a fire resistant fabric, for example, flame retarded cotton which in use also 'char bonds' to the intumescent/fibre core. The backing layer and the facing layer may also be formed from a variety of other materials, however, such as wood or metal foil, e.g. aluminium.

These external (facing and/or backing) layer or layers serve to protect the textile material both physically and mechanically as well as contributing to the aesthetics of the finished article. These external layers may also serve to shape the barrier material. If the facing and/or backing layer(s) are embedded within the respective surfaces of the textile, they will provide reinforcement during heat exposure. They may also contribute to the flame and heat resistance of the barrier article.

In alternative embodiments, the material includes a central layer comprising the intimate mixture of said organic intumescent filler and said organic fibres, and two outside layers of fibre only which are separated from the central layer by two sheets of fabric. This fabric may be woven, knitted, non-woven etc. as convenient.

As before, the fibres of the central layer may include an inorganic component and/or incompatible organic fibres and where an inorganic component is present, this may be as a hybrid organic fibre or as a blend of simple organic and inorganic fibres.

Conveniently, the two woven or similar fabrics are made of organic fibres which char intensely within said temperature range.

Conveniently, a material according to the present invention comprises an amount of intumescent sufficient to cause it to increase in thickness by at least 20% when exposed to a temperature of at least 500° C.

Where a material according to the present invention includes a backing layer and a facing layer of flame-retarded fabric then, conveniently, the backing and facing layers join to form an envelope containing the fibre/intumescent assembly.

The novel materials of the present invention may have a relatively low area density normally in the range 200 to 1000 $gm^{-2}$ which corresponds to dens,ties of the order of 100–400 $kg\ m^{-3}$. This is advantageous when they are to be used in the transport industry, e.g. in motor vehicles and aircraft, where weight is an important consideration. In general, any of the conventional techniques of fabric production may be employed to produce the fibre assembly, examples being weaving, knitting, needle-punching, stitch bonding and adhesive bonding.

A wide variety of organic intumescent systems may be used in the materials of the present invention. Such systems commonly comprise an acid source, a carbonific material, a spumific compound and a skin-forming soft resin binder to prevent the escape of generated gases from the intumescent. Examples of suitable acid sources are moro- and di-ammonium phosphates, ammonium polyphosphates, melamine phosphate, guanyl phosphate, urea phosphate, ammonium sulphate and ammonium borate. Examples of suitable carbonific materials are glucose, maltose, arabinose, erythritol, pentaerythritol, di- and tri-pentaerythritol, arabitol, sorbitol, insitol and starches. Examples of suitable spumific compounds include melamine, guanidine, glycine, urea and chlorinated paraffin. Intumescents made up from these selected examples in accordance with well known procedures will all produce an intense char within the temperature range 200° C. to 500° C. to give the desired char bonding effect. A wide variety of materials are available for use as the soft resin binders.

In a preferred embodiment, where the organic fibres are cellulosic and contain either a phosphorus-based flame retardant (e.g. Proban, Pyrovatex, ammonium polyphosphate) or any other suitable acid-generating species e.g. silicic acid in the case of VISIL, the intumescent comprises an ammonium phosphate/melamine/pentaerythritol system.

On heating the material of this preferred embodiment, the intumescent will decompose above 250° C. to give polyphosphoric acid, nitrogen, and a carbonaceous char which, as a semi-liquid suspension, foams and expands to wet adjacent fibre surfaces and fill the available space.

The chemical reactions may be summarised individually as:

Interaction between the reaction sequencies (i) and (ii) will produce a fibre char-intumescent char or char-bonded structure.

It is envisaged that intumescent activity and heat resistance may be enhanced by the addition of a ceramic pigment such as titanium dioxide because in addition to stabilising the char, this will also leave an inorganic replica after char oxidation thereby adding to the inorganic fibre residues and increasing the mechanical integrity of the material at temperatures above 500° C. Its presence in the char-bonded structure will enhance the oxidation resistance by further reducing oxygen diffusion.

With the preferred embodiments of the present invention using VISIL, the organic fibrous component within the core is designed to burn very slowly with little smoke and minimal toxicity. After combustion the fibres provide a coherent inorganic fibre matrix which is able to continue to function satisfactorily as a flexible heat barrier.

The materials of the present invention can be purpose designed to meet a particular requirement e.g. as an underlayer or for incorporation into a surface fabric. Depending on the intended use, the thickness of fibre assembly can be changed and the intumescent specification adjusted.

Sample tests using VISIL viscose fibre as a nonwoven core material demonstrate the novel responsive characteristics of the system, as shown in the following table (Table 1).

TABLE 1

| Fabric 600 g/sq · m | |
|---|---|
| VISIL non-woven core | 200 g/sq · m |
| Backing fabric (FR cotton × 2) | 200 g/sq · m |
| Intumescent | Ammonium phosphate base, 50 g/sq · m |
| | (corresponding to 25% level with respect to VISIL) |
| Sample size | 7.6 × 7.6 cm × 4.1 mm |
| Heat source | Muffle furnace |

| Temp °C. | Exposure time | Thickness % | Weight loss % |
|---|---|---|---|
| 500 | 2 | 224 | 44.4 |
| | 5 | 202 | 45.0 |
| | 10 | 173 | 73.9 |
| 900 | 2 | 149 | 68.2 |
| | 5 | 105 | 83.5 |
| | 10 | 105 | 83.5 |
| 1200 | 2 | 90 | 88.8 |
| | 5 | 95 | 88.9 |
| | 10 | 81 | 89.5 |

Another example of a material according to the invention is illustrated by the following.

Fabric Formation

The fabric comprises of a nonwoven core and a sheath fabric.

Sheath Fabric Structure

100% plain weave cotton fabric treated with a phosphorus and nitrogen containing flame retardant (Pyrovatex CP, Ciba Geigy), area density 200 g/m².

Nonwiven Core Structure

100% VISIL Type 33, viscose staple fibre containing silicic acid sold by Kemira OY of Valkeakoski, Finland 3.5 dtex/40 mm, area density 200 g/m².

Production

A web of VISIL fibre is first produced, this is then covered with a single layer of the sheath fabric and needle punched, on both sides of the web. The needle penetration being 12 mm, the area density of the final fabric 600 g/m². The intumescent powder and bonding resin are added to the web before needling takes place, the amount added being calculated as a percentage by weight of the nonwoven component of the fabric.

Intumescent Powder:

Amgard MPC 1000 (ammonium polyphosphate, Albright and Nilson Ltd.)

Resin: Revacryl 272 (pure acrylic and styrene/acrylic copolymer water based dispersions, Harlow Chemical Company Ltd.).

Example fabric I: Produced as above without any intumescent being added.

Example fabric II: As above adding 25% intumescent and 5% resin.

Example fabric III: As above adding 30% intumescent and 5% resin.

Test Procedure

Fabric sample size 7.62 cm×7.62 cm.

The samples were exposed in a furnace at various temperatures over a range of times. The samples were mounted on a stand to maintain oxygen accessibility during heating. Exposed samples were tested for changes in thickness and weight.

Results

TABLE 2

| Fabric | Temp (°C.) | Time (mins) | Thickness (%) | Wt. Loss (%) |
|---|---|---|---|---|
| I | before test | | 3.8 mm (=100%) | |
| II | before test | | 4.1 mm (=100%) | |
| III | before test | | 4.4 mm (=100%) | |
| I | 500 | 2 | 86.8 | 65.7 |
| " | | 5 | 92.1 | 74.4 |
| " | | 10 | 100.0 | 78.0 |
| " | 700 | 2 | 115.0 | 61.1 |
| " | | 5 | 92.1 | 73.1 |
| " | | 10 | 78.9 | 75.0 |
| " | 900 | 2 | 100.0 | 66.7 |
| " | | 5 | 89.5 | 78.7 |
| " | | 10 | 84.2 | 83.5 |
| " | 1000 | 2 | 78.9 | 85.4 |
| " | | 5 | 76.3 | 88.6 |
| " | | 10 | 76.3 | 90.6 |
| " | 1100 | 2 | 107.0 | 87.3 |
| " | | 5 | 78.9 | 90.9 |
| " | | 10 | 76.3 | 90.9 |
| " | 1200 | 2 | 81.6 | 88.6 |
| " | | 5 | 78.9 | 91.7 |
| " | | 10 | 76.3 | 91.0 |
| II | 500 | 2 | 224.4 | 44.4 |
| " | | 5 | 202.4 | 45.9 |
| " | | 10 | 173.2 | 73.9 |
| " | 700 | 2 | 119.5 | 58.2 |
| " | | 5 | 109.6 | 65.9 |
| " | | 10 | 92.7 | 76.9 |
| " | 900 | 2 | 148.8 | 68.2 |

TABLE 2-continued

|   |       |    |       |      |
|---|-------|----|-------|------|
|   |   "   | 5  | 139.0 | 74.5 |
|   |   "   | 10 | 104.9 | 83.5 |
|   | 1000  | 2  | 124.4 | 67.6 |
|   |   "   | 5  | 117.1 | 80.7 |
|   |   "   | 10 | 107.3 | 87.6 |
|   | 1100  | 2  | 78.0  | 78.0 |
|   |   "   | 5  | 129.3 | 88.7 |
|   |   "   | 10 | 109.8 | 87.8 |
|   | 1200  | 2  | 90.2  | 88.8 |
|   |   "   | 5  | 95.1  | 88.9 |
|   |   "   | 10 | 80.5  | 89.5 |
| III | 500 | 2  | 109.1 | 54.9 |
|   |   "   | 5  | 102.3 | 60.5 |
|   |   "   | 10 | 122.7 | 65.2 |
|   | 700   | 2  | 138.6 | 63.3 |
|   |   "   | 5  | 129.5 | 63.2 |
|   |   "   | 10 | 93.2  | 71.4 |
|   | 900   | 2  | 104.5 | 69.3 |
|   |   "   | 5  | 84.1  | 79.5 |
|   |   "   | 10 | 79.5  | 86.0 |
|   | 1000  | 2  | 84.1  | 78.6 |
|   |   "   | 5  | 77.3  | 89.6 |
|   |   "   | 10 | 45.5  | 89.5 |
|   | 1100  | 2  | 72.7  | 87.5 |
|   |   "   | 5  | 61.4  | 90.2 |
|   |   "   | 10 | 68.2  | 90.5 |
|   | 1200  | 2  | 52.3  | 90.3 |
|   |   "   | 5  | 52.3  | 89.7 |
|   |   "   | 10 | 45.5  | 89.8 |

Subjective Comments of Fabrics, I, II and III Performance Over Temperature Range 500-1200° C.

| Temp (°C.) | Time (mins) |   |
|---|---|---|
| 500 | 2-10 | Fabric maintains coherence and flexibility. Fabric shrinkage occurring in proportion with time. |
| 700 | 2-10 | As for 500° C., except shrinkage in sheath fabric occurring in fabric I as time increases, and to a lesser extent in fabrics II and III. |
| 900 | 2-10 | Fabric retains coherence but with reduced flexibility. Fabric shrinkage occurs. |
| 1000 | 2-10 | As for 900° C., except at 10 mins. only the VISIL core remains; fabric coherence and some flexibility maintained. |
| 1100 | 2-10 | VISIL core remaining, some coherence and flexibility retained. |
| 1200 | 2-10 | VISIL core remains, friable, high degree of shrinkage. No carbonaceous residue remaining. |

Examples of these different forms of fibre assembly for use in the materials of the present invention are shown, by way of example only, In the somewhat schematic cross-sections depicted in FIGS. 1 to 3 of the accompanying drawings in which.

Any fire-resistant material based on the novel concepts of the present invention requires the definition of a number of major variables including the fibre genus or blend of generic types, the fabric structure and the intumescent type and concentration. The examples described below are of the type shown in FIG. 2 in which the fibre and fabric structures remain constant and a given intumescent is present at various levels.

Figure 2:
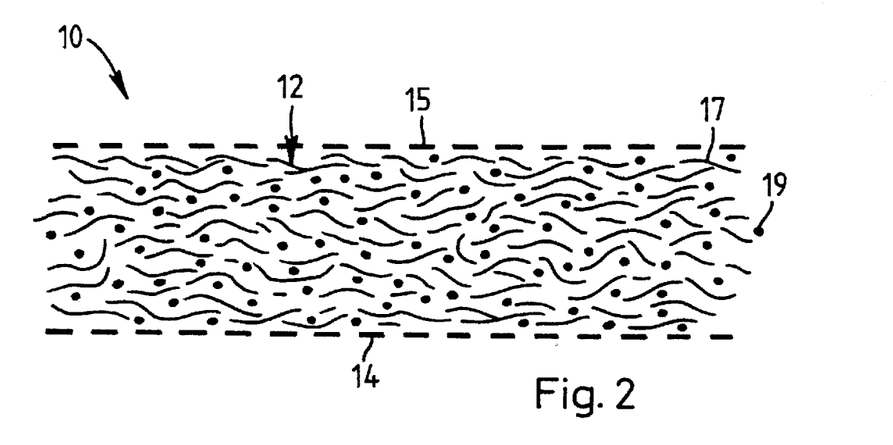
FIG. 2 represents an alternative, more practical, version where the assembly is contained between flame retardant, non-thermoplastic face and backing fabrics and is exemplified above with performances described in Tables 1 and 2 and FIGS. 4-7 (see below)

Thus referring now to FIG. 2 of the drawings, the three layer material 10 comprises a non-woven core 12 which is sandwiched between a backing layer 14 and a facing layer 15. These backing and facing fabrics are flame retarded and protect the core physically and mechanically as well as contributing to the aesthetics of the material. The core is a needle punched nonwoven fabric comprising VISIL fibres 17 (Kemira Fibres, Finland) whose molecular structure contains organic and inorganic components. VISIL fibre is a hybrid containing cellulose and silic acid, which chars and forms silica at high temperatures. The components are as follows: 100% VISIL type 33, viscose staple-fibre 3.5 dtex 40 mm; 100% plain weave cotton fabric treated with a phosphorus and nitrogen-containing flame retardant (Pyrovatex CP, Ciba Geigy), area density 200 $gm^{-2}$; ammonium polyphosphate based intumescent powder, (Amgard MPC 1000, Albright & Wilson Ltd.); acrylic and styrene/acrylic copolymer as a water based dispersion (Revacryl 272, Harlow Chemical Co. Ltd.).

The composite material was produced on an Automatex laboratory nonwoven line. Two webs of VISIL were produced each having an area density of 100 $gm^{-2}$. One web was then placed on a single layer of the flame retardant cotton fabric. A powdered intumescent/resin mixture 19 was sprinkled on to the web surface. The second web was laid on to the intumescent-coated lower web and needled to consolidate the assembly. A second flame retardant cotton fabric was laid upon the upper needled web and the whole assembly (fabric-web-intumescent-web-fabric) was needled to bond the upper fabric and lower webs together and disperse the intumescent. The composite material was then heated at 120° C. for 5 minutes, to enable bonding of the intumescent/resin combination to the fibres. Four fabrics were produced; I,II,III and IV continuing 0,30,40 and 50% (w/w) intumescent respectively applied in combination with 5% (w/w) resin with respect to the mass of the web (200 $gm^{-2}$). Nominal area densities of the composites were 600,670,690 and 710 $gm^{-2}$ respectively. As already explained, material type I is not in accordance with the present invention and is included for comparison purposes only.

Each fabric sample was subjected to the following test protocol:

(i) Flame retardancy was tested in accordance with British Standard BS 5438:1989 Test 2A (face ignition) and Test 2B (bottom edge ignition).

(ii) Resistance to heat radiation was undertaken by exposing 76×76 mm specimens of each fabric placed on a raised quartz stand for up to 10 minutes at selected temperatures in the range 500°-1200° C. in a furnace having a recorded temperature accuracy of ±5° C. The quartz stand ensured oxygen access to both sides of the fabric during heating. Performance was measured in terms of thickness retention, weight loss and shrinkage in two major directions.

(iii) Heat release measurements were carried out using the Ohio State University (OSU) apparatus according to ASTM E906–1983. This is designed to measure both the maximum heat release rates (HRR) during the initial 5 minutes and the total HRR integrated over the first 2 minutes of sample combustion following exposure to a radiation source of 35 kJ m$^{-2}$ in the presence of a small igniting flame.

The following table (Table 3), shows the effect of temperature and time of exposure on fabric weight loss and shrinkage. It is to be noted that the initial masses (76×76) were: fabric I=3.34, II=3.66, III=3.74, IV=3.90 g and the initial thicknesses were: fabric I=3.80, II=2.40, III=2.65, IV=2.36 mm.

TABLE 3

| Temperature °C. | Exposure time, min | Weight loss % Fabric | | | | Shrinkage % Fabric | | | |
|---|---|---|---|---|---|---|---|---|---|
| | | I | II | III | IV | I | II | III | IV |
| 500 | 2 | 66 | 48 | 46 | 45 | 13 | 16 | 14 | 17 |
| | 5 | 74 | 56 | 45 | 48 | 20 | 21 | 16 | 19 |
| | 10 | 78 | 59 | 54 | 52 | 18 | 27 | 31 | 17 |
| 700 | 2 | 61 | 60 | 54 | 55 | 19 | 23 | 21 | 21 |
| | 5 | 73 | 66 | 58 | 55 | 25 | 31 | 30 | 29 |
| | 10 | 75 | 68 | 70 | 65 | 16 | 35 | 37 | 34 |
| 900 | 2 | 67 | 65 | 65 | 58 | 36 | 32 | 33 | 30 |
| | 5 | 78 | 78 | 77 | 72 | 38 | 38 | 48 | 39 |
| | 10 | 84 | 88 | 85 | 86 | 31 | 69 | 74 | 61 |
| 1000 | 2 | 85 | 66 | 71 | 73 | 51 | 37 | 39 | 36 |
| | 5 | 89 | 84 | 83 | 80 | 53 | 54 | 51 | 51 |
| | 10 | 91 | 90 | 89 | 90 | 57 | 68 | 66 | 70 |
| 1100 | 2 | 87 | 75 | 78 | 86 | 55 | 39 | 41 | 44 |
| | 5 | 91 | 82 | 87 | 80 | 67 | 47 | 51 | 45 |
| | 10 | 91 | 94 | 91 | 99 | 65 | — | 72 | — |
| 1200 | 2 | 89 | 75 | 78 | 84 | 60 | 38 | 45 | 52 |
| | 5 | 92 | 92 | 91 | 86 | 65 | 70 | 75 | 47 |
| | 10 | 91 | 92 | 90 | 89 | 71 | 64 | 66 | 66 |

Each fabric, including that containing 0% intumescent, met the performance flammability indexes A and B in accordance with BS 6249: Part 1 : 1982 when tested to BS 5438 : 1989 Test 2A (face ignition) and Test 2B (edge ignition) respectively.

Figure 4:
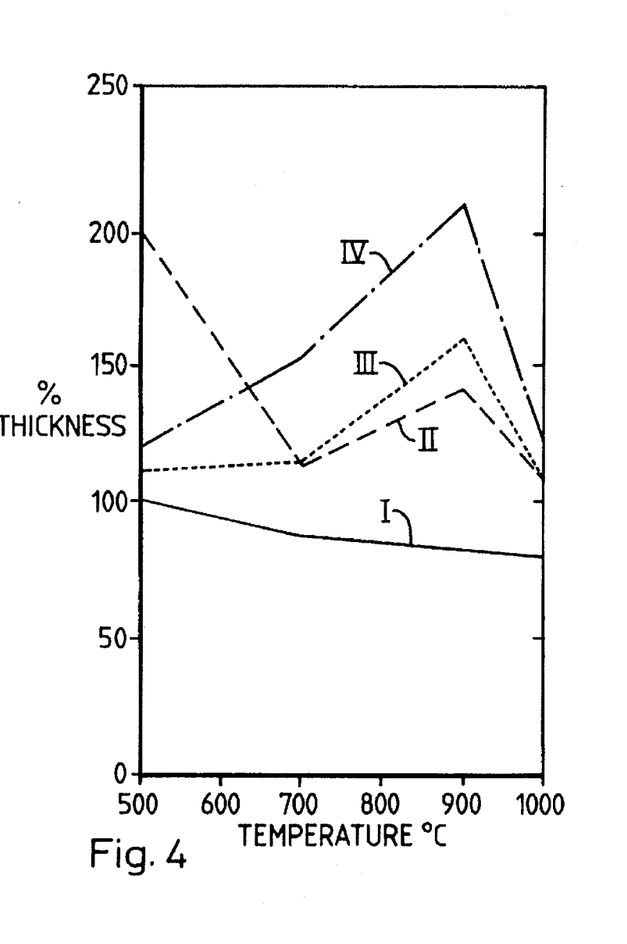
FIGS. 4 to 7 depict performance graphs for four sample materials, three of which are constructed in accordance with FIG. 2 while the other is included for purposes of comparison only and contains no intumescent.
Figure 5:
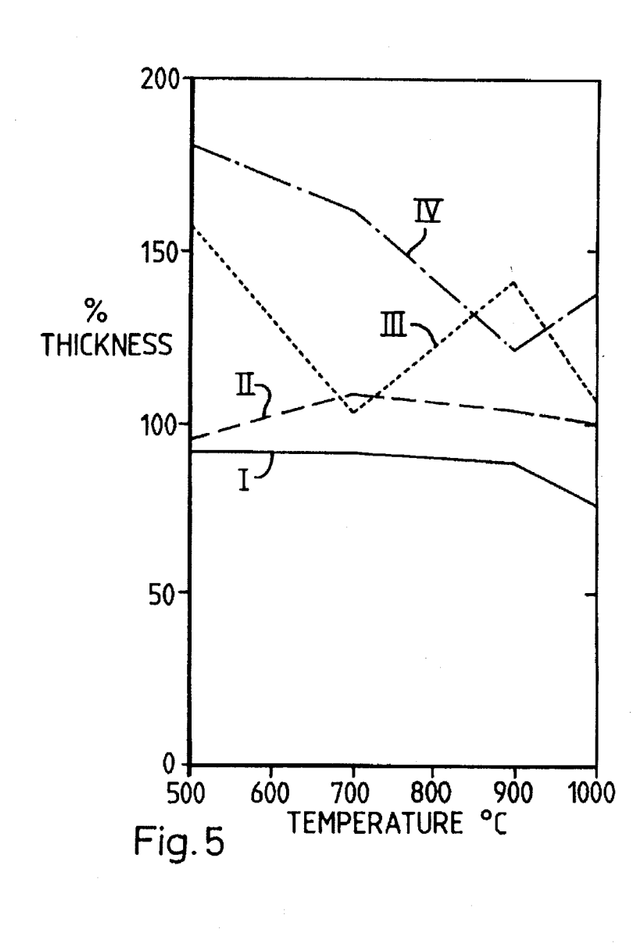
Figure 6:
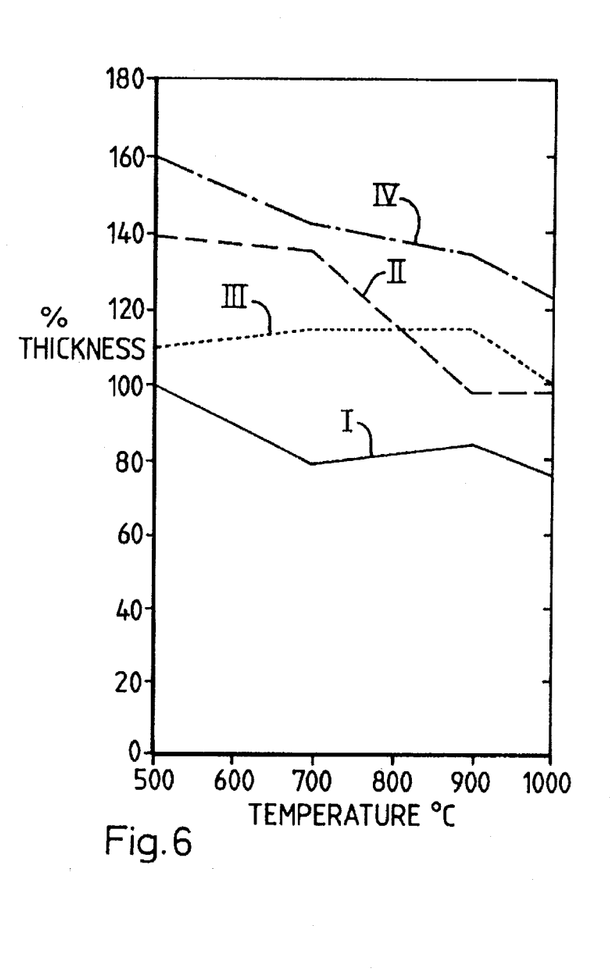

The effects of radiant heat exposure for 2–10 minutes are seen in FIGS. 4–6 with regard to thickness and in Table 3 with reference to weight loss and shrinkage.

Figure 7:
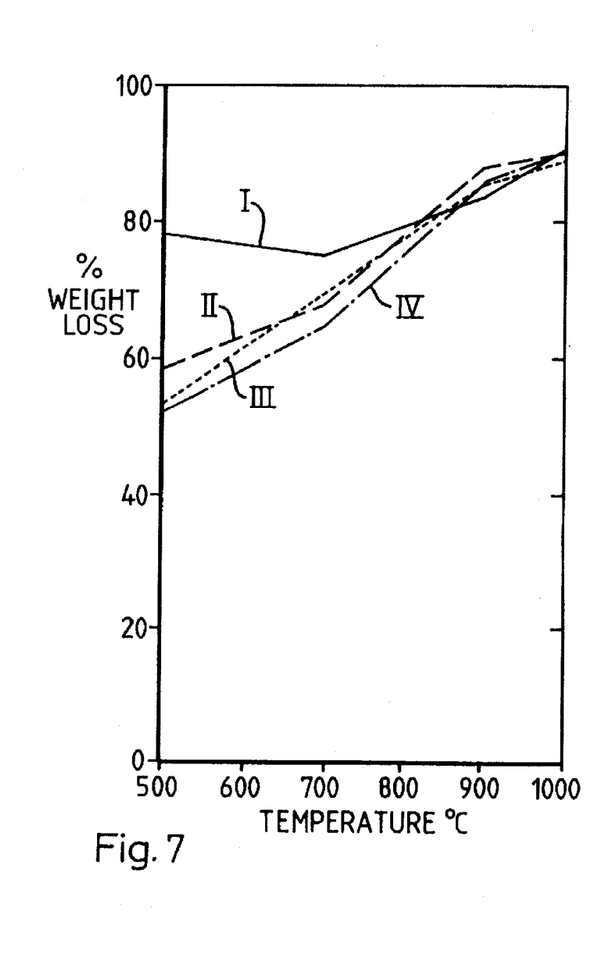

In FIGS. 4 to 6, the graphs indicate changes in material thickness as a function of temperature after exposures of two minutes (FIG. 4), five minutes (FIG. 5) and ten minutes (FIG. 6) respectively, while the graph of FIG. 7 indicates weight losses of the four materials as a function of temperature after ten minutes exposure.

The sample materials represented have intumescent contents by weight of 0% (I), 30% (II), 40% (III) and 50% (IV).

As already indicated, the material of plots I does not fall within the scope of the present invention and the inclusion of its performance characteristics in the graphs of FIGS. 4 to 7 is merely for comparison purposes with the plots II,III and IV.

After 2 minutes exposure, increasing temperature produces an increase In thickness (see FIG. 4) which maximises in the range 800°–900° C. Up to this maximum, the intumescent swells, adjacent fibres char, char bonding occurs and the composite thickness increases. Counter to this is the accompanying oxidation of these chars which causes eventual reduction In composite thickness. Above 1000° C. the silica skeletons of the VISIL fibres remain leaving a structure having a thickness close to that of the original composite. The slight differences in residual thickness of fabrics I,II,III and IV reflect the initial intumescent concentrations present and their proportionate swelling actions. After longer exposures of 5 and 10 minutes (see FIGS. 5 and 6) initial intumescent-driven swelling has fully taken place at 500° C. and char oxidation is already occurring. Fabrics thus achieve their silica residual forms at temperatures approaching 900° C.

Results in Table 3 show that considerable weight loss has already occurred from all fabrics heated up to 500° C. and FIG. 7 shows a comparison of behaviour of all four fabrics after 10 minute exposures. Weight losses at lower temperatures (<500° C.) are a consequence of dehydration of VISIL fibres to both cellulosic char and silica and of intumescent to char. The increased presence of intumescent reduces mass loss at a given time and temperature below 900° C. because the enhanced char and composite thickness reduces rates of dehydration at lower temperatures and char oxidation at higher temperatures. Once full char oxidation has occurred above 900° C., the similar percentage weight losses reflect the resulting masses of residual silica fabric skeletons.

Fabric shrinkage also accompanies char formation up to 500° C. and this increases with concentration of intumescent. This is a consequence of Intumescent-driven fabric swelling and at high temperatures, once char oxidation is complete, the silica residues of fabrics II,III and IV show greater shrinkages than the control fabric I.

Heat release results are presented in Table 4 for fabrics made in accordance with the structure of FIG. 2. These include results reported for a 280 gm$^{-2}$ woven 80% carbon/20% aramid commercial barrier fabric. These results show a superior performance to the latter which improves with increasing intumescent concentration in terms of reducing total and peak heat release rates.

TABLE 4

| Sample | Peak heat release rate kW m$^{-2}$ | Total heat release rate kW min m$^{-2}$ |
|---|---|---|
| 80% carbon 20% aramid | 38.3 | 16.7 |
| 30% intumescent | 34.7 | 20.1 |
| 40% intumescent | 16.4 | 13.0 |
| 50% intumescent | 13.8 | 14.0 |

The results show that a fabric comprising fibres possessing both organic and inorganic characteristics interdispersed with an intumescent system provides a flexible barrier which increases its thickness when exposed to temperatures up to 500° C. for 10 minutes. Above this temperature char oxidation occurs which causes a thickness-reducing effect. Once temperatures approach 1200° C. when full char oxidation has occurred, the inorganic residue retains the original fabric thickness and hence continues to afford thermal barrier properties. Much reduced heat release measurements show that the materials of the present invention have a superior performance when compared to similar carbon-aramid fibre-containing fabrics.

Figure 1:
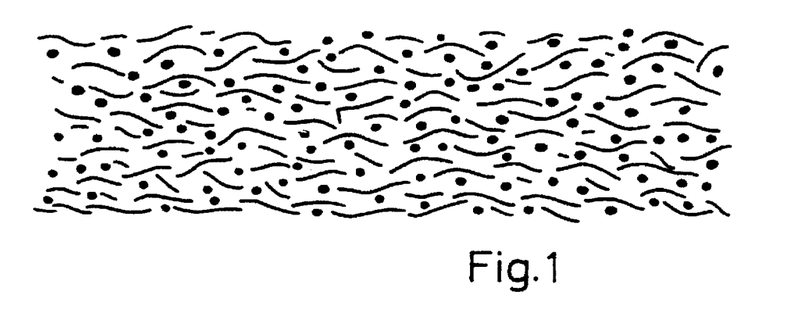
FIG. 1 represents the idealised structure whereby the organic and inorganic fibrous assembly has an intumescent dispersed throughout it.

Tests have also been carried out on a number of materials made with a blend of fibres in accordance with the construction of FIG. 1 of the drawings, namely nonwoven webs with a density of 200 gm$^{-2}$. The four materials tested were made up as follows:

Material (i) 70% VISIL/30% Novoloid (Kynol)+Intumescent (3.5 dtex 40 mm) (3.3 dtex 50 mm)

Material (ii) 70% FR Viscose/30% Novoloid (Kynol)+Intumescent (3.3 dtex 51 mm)

Material (iii) 70% VISIL/30% (13 μm dia)E-Glass+Intumescent.

Material (iv) 70% FR Viscose/30% E-Glass+Intumescent.

Observations based on these tests are given below where 'flame retarded' is abbreviated as 'FR'.

Material (i) Blend:

Organic/inorganic fibre+Organic fibre which chars >350° C. to pure carbon.

Result:

The intumescent char and VISIL char component interact (char-bonding); the carbonised Kynol fibres become coated in intumescent but with little sign of chemical interaction.

Material (ii)
Blend:
FR organic+Organic fibre which chars >350° C.
Result:
The Intumescent and FR viscose interact (char-bonding) because of the compatibility of their char forming chemistries; the intumescent char physically coats the carbonised Kynol fibres.

Material (iii) Blend:
Organic/inorganic fibre+Inorganic fibre blend.
Result:
The intumescent char and VISIL char components interact (char bonding); the inorganic (glass) fibres are coated by intumescent char.

Material (iv) Blend:
FR organic fibre+Inorganic fibre blend.
Result:
The intumescent and FR viscose chars interact (char bonding). The inorganic (glass) fibres are coated by intumescent char.

The conclusions based on these tests on materials (i) to (iv) are as follows:

(1) The intumescent char-fibre char reaction occurs between what may be termed 'compatible' intumescent and FR organic fibre components (whether as VISIL or FR viscose). In the examples chosen, the intumescent and fibre components are 'compatible' in so far as their char-forming mechanisms operate over the same temperature range (250°–450° C.) and interact (simultaneous interaction of physical and chemical reactions).

(2) The presence of the inorganic component in these samples, important for high temperature resistance above char oxidation temperatures and as a skeletal structure which impedes char oxidation (via reduced oxygen accessibility), may be either as a component within a single organic/inorganic fibre, e.g. VISIL or as a separate blended fibre, e.g. E-Glass.

In both these two cases, the organic fibre or fibre component must be flame retarded either directly (e.g. FR viscose which contains an FR-additive FR cotton would be an alternative) or indirectly (e.g. VISIL, where the silicic acid acts as a flame retarding char-promoter as well as an inorganic component generator).

(3) The coating by intumescent of the E-glass and the carbonised Kynol or other aromatic fibres, suggests wetting of the fibre surfaces by the intumescing and molten intumescent and this will ensure a maximum degree of intumescent char-fibre char and intumescent char-inorganic contact and hence structural consolidation (and reduced oxygen accessibility).

Thus the additional presence of incompatible organic char-forming fibres while not giving the high degree of interaction shown by compatible systems does show some structural consolidating effect and hence reduced oxygen accessibility. Thus it is envisaged that blends of FR organic fibre and non-compatible char-forming organic fibre and intumescent may well give enhanced heat and flame resistance at temperatures up to about 700° C. or so.

(4) Because of the observed interaction between the intumescent and FR viscose chars, it is probable that when one or more FR cotton fabrics are embedded within or facing the nonwoven fibre assembly (e.g. as with the three layer and five layer structures of FIGS. 2 and 3), then a char-char interaction (char bonding) will also occur between the fibre or fibre/intumescent layers and the intermediate or facing fabrics.

Because of these recent observations that the activated intumescent wets/coats/weakly interacts with a high temperature charring aromatic fibre (such fibres char >350° C. by a different mechanism to FR organics) e.g. novoloid (Kynol) fibre, it is envisaged that the materials of the present invention may additionally include an aromatic organic fibre e.g. novoloid, polyaramid, etc. instead of the optional inorganic component.

Figure 3:
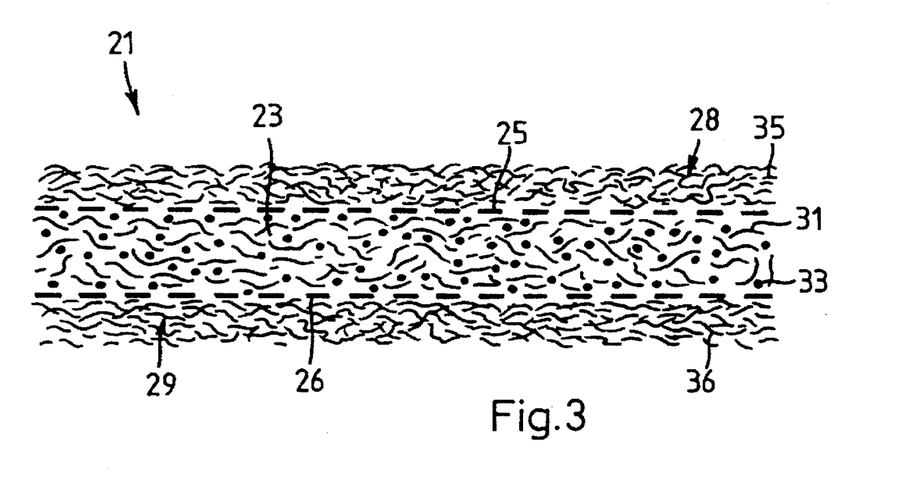
FIG. 3 represents another alternative in which the assembly is housed between two scrims faced by outer layers of fibres which may be more closely packed together than the fibres of the central assembly, if desired.

Referring now to FIG. 3 of the drawings, the five layer material 21 there depicted comprises a central layer 23 separated by two sheets of woven or similar fabric 25,26 from two outside layers 28,29 formed of fibres only. In this figure, reference numerals 31 and 33 indicate the organic fibres and organic intumescent of the central layers whilst reference numerals 35,36 indicate the fibres of the two outside layers.

To form the material with the structure illustrated, a web of VISIL area density 200 gm$^2$ was needled to a single layer of the sheath fabric (25,26), a second web of VISIL fibres area density 100 gm$^2$ was produced and this was treated with the resin/intumescent combination. This second web was placed on to the sheath fabric which had the web on the outer side, the fabric was then doubled and needled on both sides. The resultant fabric is a five layered structure comprising a 200 gm$^2$ web (28), a layer of fabric (25), a 200 gm$^2$ web (31), a layer of fabric (26), and a 200 gm$^2$ web (29).

In one example of this material, the hybrid organic fibres 31 are 100% VISIL Type 33, viscose staple fibre 3.5 dtex/40 mm, the scrims 25,26 are formed of 100% cotton fabric treated with a phosphorus and nitrogen containing flame retardant, area density 120 gm$^2$, and the intumescent 33 is provided by an Amgard MPC 1000 (ammonium polyphosphate based) intumescent system. Initial (pre char bonding) adhesion between the fibres 31 and intumescent 33 is provided by a Revacryl 272 (pure acrylic and styrene/acrylic copolymer water based dispersion) resin.

Two such materials designated V and VI were produced containing 0 and 200 gm$^2$ of intumescent, the resin content being kept at 10% with respect to the intumescent in the latter. The resin was applied both before and after the intumescent powder. It will be appreciated that material V is not within the scope of the present invention and is included for comparison purposes only.

In constructing the nonwoven fabrics, the needling machine was operated as follows:

1st web: fibre layer delivery speed 0.3 m/s, (for layers 28,29), fabric delivery speed 0.8 m/s (for fabrics 25,26), needling at 200 strokes/min. with a punch density of 14 mm.

2nd web: fibre layer delivery speed 1.22 m/s (for layer 23), needling at 100 strokes/min with a punch density of 10 mm.

Final needling: composite material delivery speed 1.22 m/s, needling at 200 strokes/min with a punch density of 14 mm.

To test the materials with their different intumescent contents, 76 mm ×76 mm specimens of each material were placed on a quartz stand in a muffle furnace and exposed to a range of temperatures between 500 and 1200° C. for up to 10 minutes. The quartz stand was used to ensure oxygen access to the fabric during heating. Performance was measured in terms of thickness (retention), weight loss and shrinkage in the fabric's two major directions.

The results obtained for material V (no intumescent, 10% resin content) are shown in Table 5 while those for material VI (200 gm² of intumescent, 10% resin content) are shown in Table 6.

TABLE 5

Ogms Intumescent

| Temperature C. | Time Mins. | % Wt. Loss | % Thickness | % Shrinkage |
|---|---|---|---|---|
| | | 4.95 gms (=100%) | 5.83 mm (=100%) | 7.6 cm (=100%) |
| 500 | 2 | 58.19 | 90.16 | 15.17 |
| | 5 | 60.15 | 97.96 | 31.25 |
| | 10 | 64.79 | 86.00 | 48.61 |
| 700 | 2 | 64.22 | 83.86 | 24.60 |
| | 5 | 73.51 | 78.11 | 37.69 |
| | 10 | 75.96 | 90.16 | 39.89 |
| 900 | 2 | 66.96 | 81.43 | 24.60 |
| | 5 | 74.14 | 78.09 | 33.45 |
| | 10 | 79.48 | 68.48 | 35.57 |
| 1000 | 2 | 72.57 | 79.03 | 34.52 |
| | 5 | 79.53 | 68.14 | 36.60 |
| | 10 | 80.31 | 67.80 | 37.73 |
| 1100 | 2 | 77.56 | 72.73 | 36.63 |
| | 5 | 78.60 | 72.32 | 47.70 |
| | 10 | 80.32 | 71.70 | 81.30 |
| 1200 | 2 | 81.68 | 67.85 | 48.58 |
| | 5 | 80.78 | 68.75 | 53.20 |
| | 10 | 79.04 | 68.29 | 53.18 |

TABLE 6

200 gm⁻² Intumescent, 10% Resin

| Temperature C. | Time Mins. | % Wt. Loss | % Thickness | % Shrinkage |
|---|---|---|---|---|
| 0 | | 7.47 gms (=100%) | 4.57 mm (=100%) | 7.6 cm (=100%) |
| 500 | 2 | 38.46 | 127.13 | 10.25 |
| | 5 | 60.48 | 100.3 | 18.80 |
| | 10 | 62.89 | 99.12 | 27.01 |
| 700 | 2 | 66.51 | 84.57 | 28.19 |
| | 5 | 68.36 | 84.08 | 26.85 |
| | 10 | 69.26 | 104.95 | 31.30 |
| 900 | 2 | 59.82 | 93.67 | 25.83 |
| | 5 | 70.42 | 91.93 | 33.45 |
| | 10 | 77.31 | 96.72 | 35.60 |
| 1000 | 2 | 62.76 | 94.31 | 28.00 |
| | 5 | 78.32 | 90.50 | 36.67 |
| | 10 | 78.52 | 102.90 | 39.75 |
| 1100 | 2 | 73.17 | 91.99 | 29.10 |
| | 5 | 85.74 | 77.13 | 44.74 |
| | 10 | 84.74 | 78.88 | 46.68 |
| 1200 | 2 | 82.09 | 82.68 | 39.75 |
| | 5 | 85.98 | 82.39 | 42.80 |
| | 10 | 84.25 | 102.27 | 39.80 |

Figure 8:
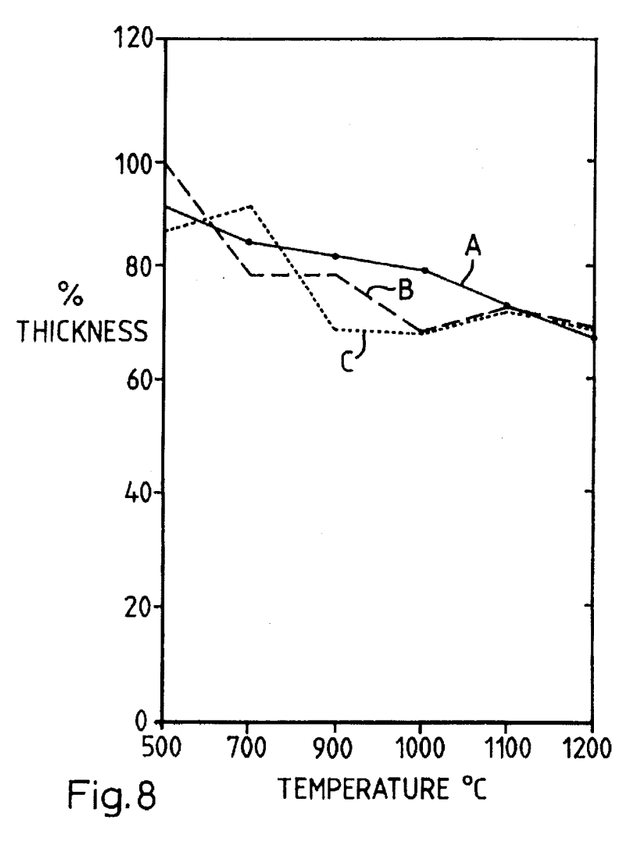
FIGS. 8 to 13 depict performance graphs for two further sample materials one of which is constructed in accordance with FIG. 3 while the other is included for purposes of comparison only and contains no intumescent.
Figure 9:
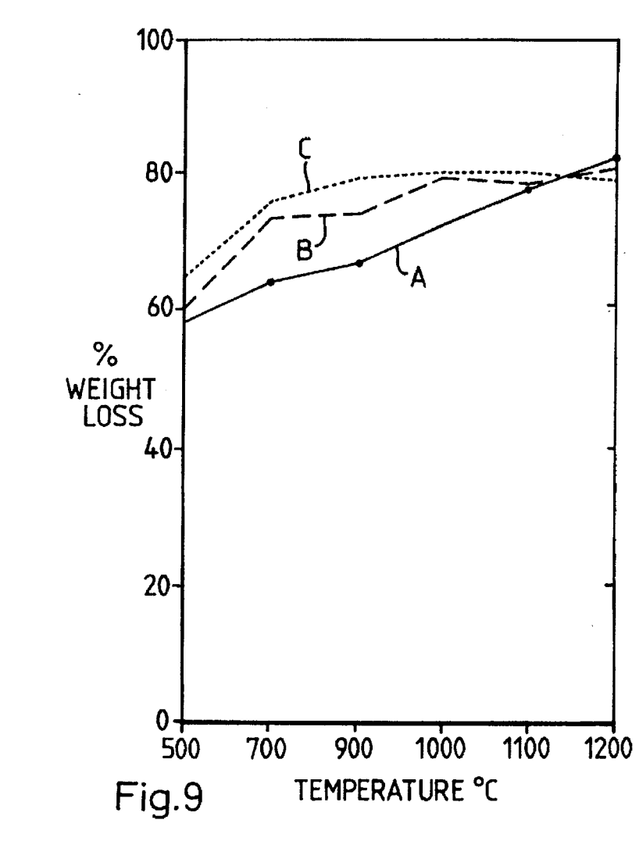
Figure 10:
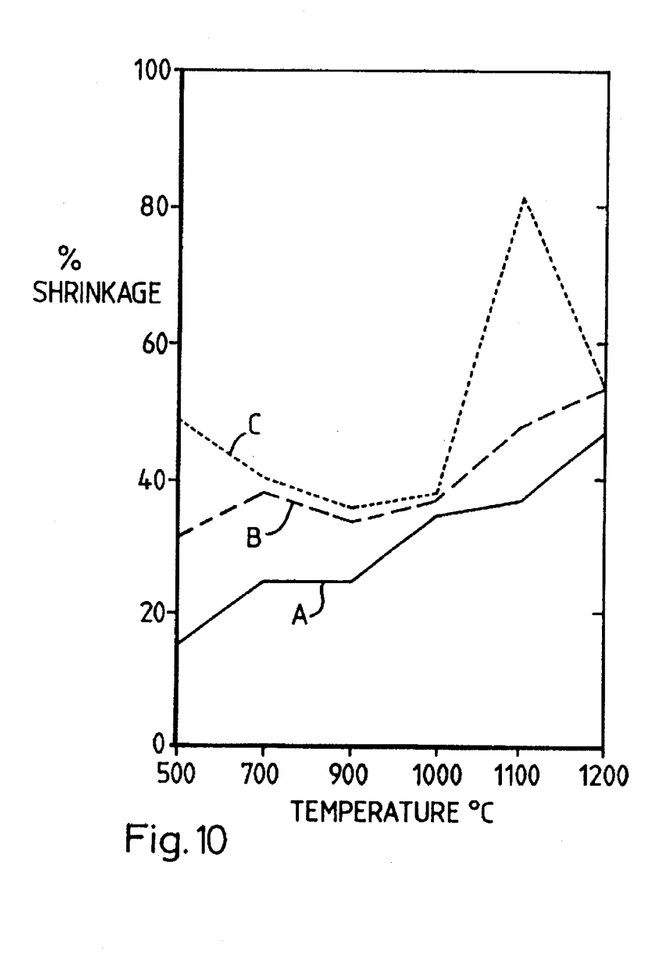
Figure 11:
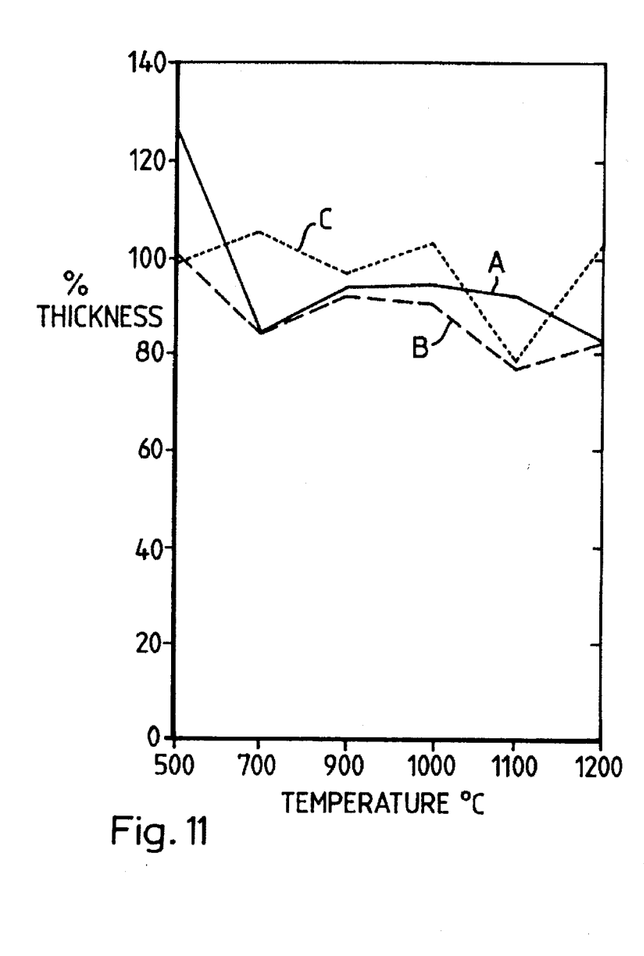
Figure 12:
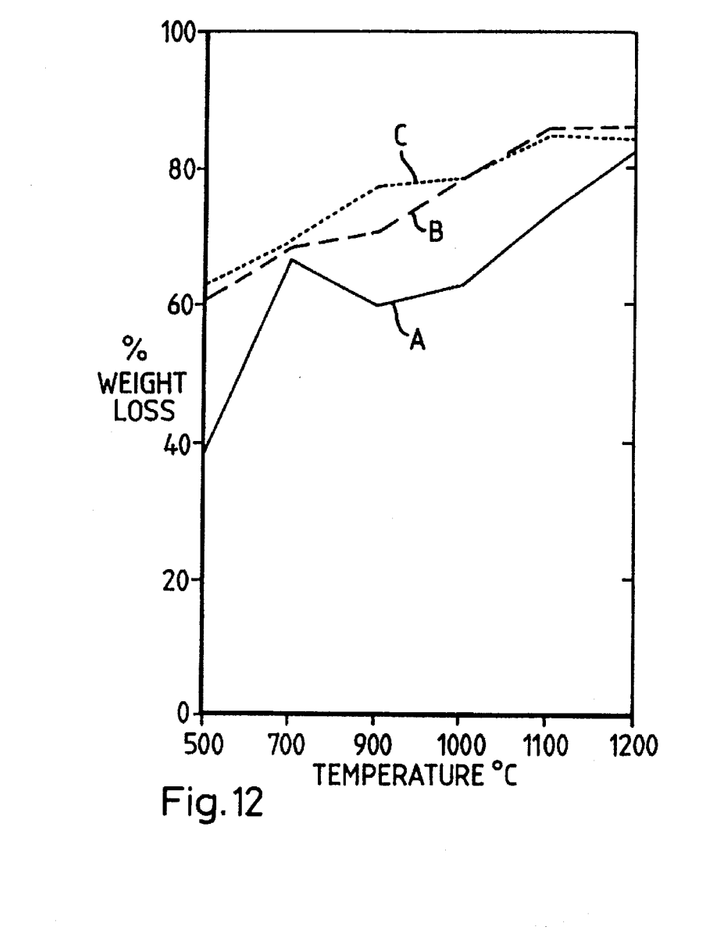
Figure 13:
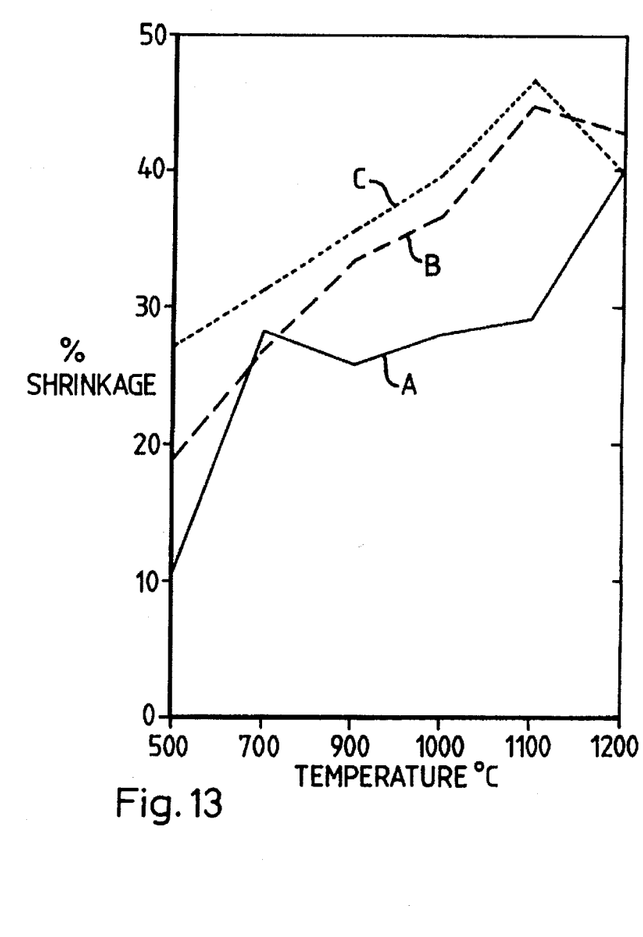

Turning now to FIGS. 8 to 10, the first three of these show the % thickness, % weight loss and % shrinkage against temperature for material V while FIGS. 11 to 13 illustrate the same information for material VI. In the graphs, plots A,B,C in each case correspond to exposure times of 2 minutes, 5 minutes and 10 minutes, respectively.

By comparing the results obtained for material VI with those obtained for the material V, the following conclusions were obtained:

1) Thickness retention

In terms of thickness retention, material VI shows that an increase in thickness occurred when heated to 500° C. and that retention of this parameter is high up to 1200° C. exposures.

2) % Shrinkage

The percentage shrinkage of material VI was significantly lower than that of material V, the initial shrinkage being approximately 10% lower. At 1200° C. for a time exposure of 10 minutes, the shrinkage % for material VI was up to 20% less than for material V. This indicates that material VI is more dimensionally stable than material V; a consequence of the char bonding effect.

3) % Weight Loss

The initial percentage weight loss after 500° C. exposure of material VI was slightly less than that of material V. However at higher temperatures, the reduced percentage weight loss for material VI was much improved at 1200° C. for 10 minutes, this being up to 10% lower than that of material V.

It is known from previous work that the intumescent has a delaying effect on the degradation of the VISIL core of the fabric and therefore fabrics treated with an intumescent system show a reduced weight loss at lower temperatures. Adding an external layer of VISIL to the fabric further delays the decomposition of the internal VISIL web and this may be done in yet another embodiment of the invention.

4) The fabric samples were subjectively assessed for performance after heat exposure. In terms of maintaining its coherence, flexibility and integrity, material VI performs better than material V. Thus, at 1200° C. for 10 minutes, material V fabric, although still retaining its nonwoven structure, was friable whereas material VI can actually be physically handled, and therefore it will still continue to act as a barrier to the propagation of the fire at higher temperatures than material V.

As these results show although the desired increase in thickness was not achieved as with the examples constructed according to FIG. 2, other fabric properties have been improved. This particular type of structure is dimensionally more stable than the example fabrics represented by FIG. 2 particularly at high temperatures.

One important point to note is that looking at the tabulated results, it can be seen that with material VI, the increase in thickness was localised and related directly to the distribution of intumescent during manufacture. This indicates that an increase in amount of intumescent added with a desired level of uniformity may achieve the desired results, and as material VI is a more stable structure than material V, it should be possible to use higher intumescent loadings with this end in mind e.g. typically in excess of 200 gm⁻² (equivalent to 100% by weight with respect to the core 23 in FIG. 3).

The sample of material VI is particularly noteworthy because it shows enhanced performance at 1000°–1200° C. In spite of a relatively low expansion in thickness at 500° C. Indeed, after 10 minutes exposure at 1200° C., material VI showed the presence of some residual unoxidised char, thus demonstrating the effect that char bonding has in reducing char oxidation rate.

In addition, the samples of material VI have a much reduced shrinkage compared with materials II,III,IV discussed earlier. The inclusion of flame retarded scrims embedded in the material will enter into intimate char bonding with the other components and, by preventing shrinkage, will reduce the expansion tendency. However, such Is the character of the char bonding that oxygen diffusion Is significantly reduced and hence char oxidation.

We claim:

1. A flexible fire and heat resistant material comprising an intimate mixture of organic intumescent filler and organic fibers, said organic intumescent filler and said organic fibers each being adapted to char intensely within the temperature range of 200° C. to 500° C.

2. A material according to claim 1 wherein the organic fibers are selected from the group consisting of flame-retardant fibers and fibers that release a flame retardant on being heated.

3. A material according to claim 2 wherein the organic fibers comprise one of a flame retardant cotton viscose fiber and a wool fiber.

4. A material according to claim 1, including an inorganic fiber component.

5. A material according to claim 4 comprising a blend of simple organic and inorganic fibers.

6. A flexible fire and heat resistant material comprising an intimate mixture of organic intumescent filler and organic fibers, said organic intumescent filler and said organic fibers each being adapted to char intensely within the temperature range of 200° to 500° C. wherein the organic fiber is a hybrid fiber with both an organic and inorganic component.

7. A material according to claim 6 wherein the hybrid fiber is a viscose staple fiber containing silicic acid as flame retardant.

8. A material as claimed in claim 1 including incompatible organic fibers.

9. A material according to claim 1 comprising an amount of intumescent sufficient to cause an increase in thickness by at least 20% when exposed to a temperature of at least 500° C.

10. A material as claimed in claim 9 wherein the amount of intumescent is sufficient to cause an increase in thickness of at least 50%.

11. A material according to claim 7 wherein the amount of intumescent present is sufficient to maintain an initial thickness of the material for a period of at least. 10 minutes when heated up to 900° C.

12. A material according to claim 1, including a backing layer.

13. A material according to claim 12, including a facing layer.

14. A material according to claim 13 wherein at least one of said backing layer and said facing layer is a flame-retarded fabric.

15. A material as claimed in claim 14, wherein the backing and facing layers join to form an envelope containing the fiber/intumescent assembly.

16. A material according to claim 13 wherein at least one of the backing layer and the facing layer is a rigid material.

17. A material according to claim 13 wherein at least one of the backing layer and the facing layer is one of wood and metal foil.

18. A material as claimed in claim 1, 12, or 13, including a central layer comprising said intimate mixture of said organic intumescent filler and said organic fibers, and two outside layers of fiber which are separated from the central layer by two sheets of fabric.

19. A flexible fire and heat resistant material comprising an intimate mixture of organic intumescent filler and organic fibers, said organic intumescent filler and said organic fibers each being adapted to char intensely within the temperature range of 200° to 500° C., including a central layer comprising said intimate mixture of said organic intumescent filler and said organic fibers, and two outside layers of fiber which are separated from the central layer by two sheets of fabric, wherein the two sheets of fabric are made of organic fibers which char intensely within said temperature range.

20. A material as claimed in claim 1, wherein said organic fibers which are adapted to char intensely within the temperature range of 200° to 500° comprise first organic fibers that char intensely within said temperature range blended with second organic fibers which do not char intensely over said temperature range.

21. A material as claimed in claim 20 wherein said second organic fibers are aromatic organic fibers.

22. A material as claimed in claim 21 wherein said second organic fibers are high temperature charring organic fibers selected from the group consisting of novoloid fibers, and polyaramid fibers.

23. An article of manufacture comprising a material as claimed in claim 1.

24. A barrier textile comprising a material as claimed in claim 1.

25. An article of protective clothing comprising a material as claimed in claim 1.

26. Domestic, contract or transport upholstery comprising a material as claimed in claim 1.

27. A rigid flame barrier structure comprising a material as claimed in claim 1.

28. A heat and flame protected rigid structure comprising a material as claimed in claims 1.

29. A rigid structure as claimed in claim 27 comprising a bulkhead, baffle, fuel tank or engine component in a transport system.

* * * * *